(12) United States Patent
Melton et al.

(10) Patent No.: US 7,531,741 B1
(45) Date of Patent: May 12, 2009

(54) TRACKING SOLAR SHELTER

(75) Inventors: David S. Melton, Albuquerque, NM (US); Odes Armijo-Caster, Albuquerque, NM (US)

(73) Assignee: Sacred Power Corporation, Albuquerque, NM (US)

( * ) Notice: Subject to any disclaimer, the term of this patent is extended or adjusted under 35 U.S.C. 154(b) by 863 days.

(21) Appl. No.: 10/796,310

(22) Filed: Mar. 8, 2004

Related U.S. Application Data (60) Provisional application No. 60/452,828, filed on Mar. 7, 2003.

(51) Int. Cl.
  *H01L 31/00* (2006.01)
(52) U.S. Cl. ...................... 136/246; 52/173.3
(58) Field of Classification Search .......... 136/246; 52/173.3
  See application file for complete search history.

(56) References Cited

U.S. PATENT DOCUMENTS

| | | | | |
|---|---|---|---|---|
| 4,297,572 A * | 10/1981 | Carlton .................... 250/203.4 |
| 4,307,711 A | 12/1981 | Doundoulakis ............. 126/442 |
| 4,373,308 A | 2/1983 | Whittaker .................... 52/173 |
| 4,429,178 A * | 1/1984 | Prideaux et al. ............. 136/246 |
| 4,995,377 A | 2/1991 | Eiden ......................... 16/424 |
| 5,143,556 A * | 9/1992 | Matlin ........................ 136/244 |
| 5,228,924 A * | 7/1993 | Barker et al. ................. 136/246 |
| 5,730,117 A | 3/1998 | Berger ......................... 126/604 |
| D408,554 S | 4/1999 | Dinwoodie .................... 25/56 |
| 5,986,203 A | 11/1999 | Hanoka et al. ............. 136/251 |
| 6,058,930 A | 5/2000 | Shingleton .................. 126/600 |
| 6,201,181 B1 * | 3/2001 | Azzam et al. ................ 136/244 |
| 6,372,978 B1 * | 4/2002 | Cifaldi ........................ 136/248 |
| 6,552,257 B1 | 4/2003 | Hart et al. .................... 136/246 |
| 6,559,371 B2 | 5/2003 | Shingleton et al. .......... 136/246 |
| 6,563,040 B2 | 5/2003 | Hayden et al. .............. 136/244 |
| 6,606,823 B1 | 8/2003 | McDonough et al. ........ 47/65.9 |
| 6,672,018 B2 | 1/2004 | Shingleton ................. 52/173.3 |

FOREIGN PATENT DOCUMENTS

JP    2002194912    10/2002

OTHER PUBLICATIONS

Nath, P. et al, "Building Integrated Photovoltaic Roofing Element for Covered Parking Structures", 26th PVSC, p. 1341-1343. (1997).*
Department of Energy Publication DOE/ET/23053-1, "Solar Photovoltaic Flat Panel Applications Experiment. Draft Final Report, Sep. 30, 1978—Mar. 31, 1979". Published Mar. 1979, 264 pages.*
Sacred Power Corporation Web Site.

* cited by examiner

*Primary Examiner*—Nam X Nguyen
*Assistant Examiner*—Jeffrey T Barton
(74) *Attorney, Agent, or Firm*—Deborah A. Peacock; Vidal A. Oaxaca; Peacock Myers, P.C.

(57) ABSTRACT

The present invention comprises a tracking solar power array that provides shelter to items disposed beneath the solar power array, particularly to vehicles.

26 Claims, 12 Drawing Sheets

TRACKING SOLAR SHELTER

CROSS-REFERENCE TO RELATED APPLICATIONS

This application claims the benefit of the filing of U.S. Provisional Patent Application Ser. No. 60/452,828, entitled "Tracking Solar Array", filed on Mar. 7, 2003, and the specification thereof is incorporated herein by reference.

BACKGROUND OF THE INVENTION

1. Field of the Invention (Technical Field)

The present invention relates to a solar tracking, solar power generating shelter, particularly useful for vehicles.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Methods and devices for generating electric power using solar tracking panels are known. However, such solar systems are either fixed or are dual tracking. The dual tracking systems are, consequently, limited to being disposed on one vertical support structure and must utilize complex support systems to confer sufficient structural integrity to avoid being affected by adverse natural or man-made forces. They cannot be linked to form larger systems.

For example, U.S. Design Pat. No. 408,554 discloses a solar shade system, but it does not track the movement of the sun. Applicant has also constructed a solar carport, but it is distinguishable from the present invention in various regards, including the absence of solar tracking capabilities. U.S. Pat. No. 4,995,377 discloses a tracking solar array, but it is dual-axis tracking and cannot be linked to other such devices. U.S. Pat. No. 6,058,930 discloses a single-axis tracking device, but it relies on a complex apparatus to lend structural and mechanical integrity and strength. Japanese Patent No. JP2002194912 discloses a solar carport, but it cannot be linked to provide larger area coverage and does not track the sun's movement.

Therefore, solar tracking capacity has not been applied to larger solar array systems. The prior art does not address the need to maximize the use of space dedicated to larger solar power systems and to simultaneously maximize the amount of solar energy that can be collected.

BRIEF SUMMARY OF THE INVENTION

The present invention comprises a shelter-providing solar tracking assembly comprising solar power arrays and an inverter to convert energy from direct current to alternating current. Each array comprises solar panels that comprise photovoltaic cells. The solar power arrays are disposed on support structures comprising beams, trusses, and vertical support pillars. The solar power arrays are movable on a single-axis and are connected to a drive mechanism so that they can track the movement of the sun. The solar power arrays form an overhead shelter for items located beneath them. The solar power arrays provide electrical power to a building or structure located near them.

The assembly may comprise a back-up generator, batteries to store generated power, an electric output connector. The assembly may provide a shelter for vehicles located beneath the solar power arrays.

A primary object of the present invention is to provide for portable renewable solar energy while simultaneously providing shelter for vehicles.

A primary advantage of the present invention is that it minimizes the need for space to situate a solar power array.

Another advantage of the present invention is that it tracks solar energy so that it maximizes the amount of solar energy that is harnessed.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into, and form a part of, the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is a solar tracking, solar power array that provides shelter, particularly for vehicles. The shelter comprises a single-axis solar tracking apparatus and solar panels disposed in such a way that shelter is provided to items disposed beneath the solar panel array such as vehicles (e.g., cars, trucks, etc.) parked beneath the solar panel array. The tracking solar array preferably includes the solar power array assemblies coupled with rotor bearings and drive assemblies that include drive actuators on a torque rotator assembly held by pillars.

This array preferably uses pre-engineered, pre-manufactured solar sections which are made to recognized engineering standards and specifications. The preferred embodiment of the present invention is based on a photovoltaic system operating in a grid-tied configuration.

The preferred embodiment uses a photovoltaic system which is capable of single-axis tracking which will provide the attached building with up to 25% more power than a fixed solar structure. The photovoltaic system preferably utilizes generators to provide for back-up power. In the alternative, storage batteries may be utilized.

Each section of the solar array follows the movements of the sun. Parts of the array can be fixed while other sections track the sun for optimal solar power. The solar array preferably tracks the sun and thereby moves in the direction of the sun so that the maximum energy is produced. The structure may be positioned to track in a North-South orientation or in an East-West orientation. The preferred tracking system allows the array to follow the sun throughout the day if its longitudinal axis is positioned in a North-South configuration. If the longitudinal axis is positioned in an East-West configuration, the preferred tracking system follows the sun's seasonal movement from north to south.

Figure 1:
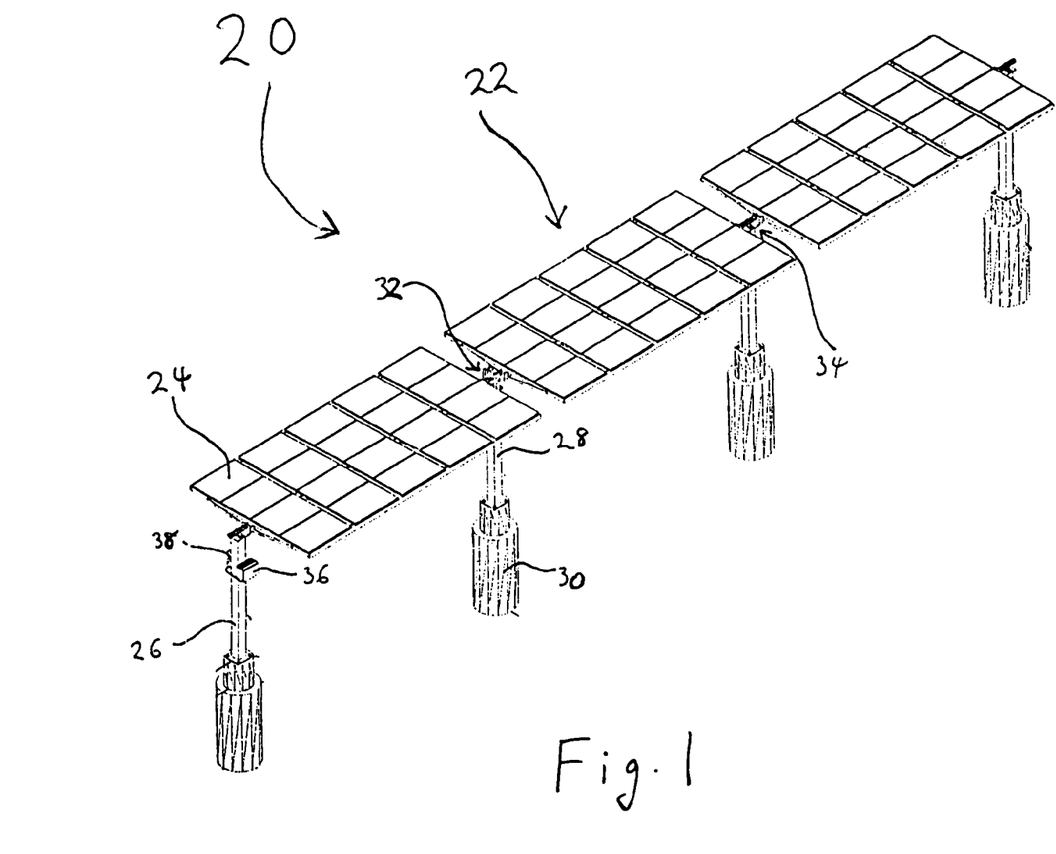
FIG. 1 is a top perspective view of the preferred embodiment of the present invention.
Figure 2:
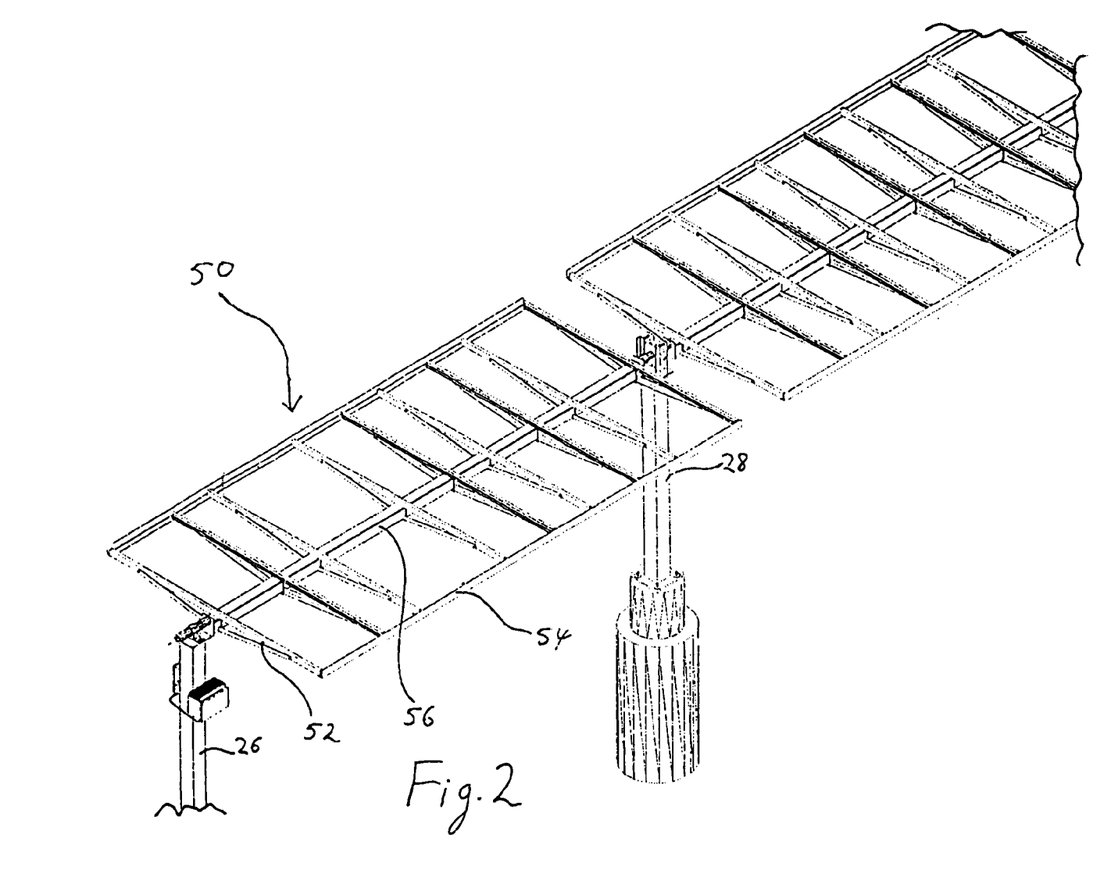
FIG. 2 is a top perspective view of the embodiment of FIG. 1 showing the support structure.

Turning now to the figures, which illustrate the preferred embodiment of the invention, FIG. 1 shows solar tracking vehicle shelter 20 comprising solar array assembly 22. Solar array assembly 22 comprises solar modules 24. There are preferably twenty solar modules 24 (of preferably 105 watts each) per solar array assembly 22. Although three solar array assemblies 22 are depicted in the figures, any number of solar array assemblies 22 may comprise solar tracking shelter 20 as desired. Solar array assemblies 22 are supported by solar array support structure 50 and array support tube 56, both of which are shown in FIG. 2, which in turn are supported by bearing assembly support pillar 26 and drive assembly support pillar 28. Support pillars 26, 28 are supported by, and attached to, piers 30. Support pillars 26, 28 and entire solar array support structure 50 are preferably constructed of steel, but may be constructed of any rigid material suitable for the purpose of providing support, and piers 30 are preferably constructed of concrete, but may be constructed of any material sufficient to provide support. Attached to array support tube 56 and support pillar 26 is rotor bearing assembly 34. Attached to array support tube 56 and support pillar 28 is drive assembly 32. Preferably, the number of rotor bearing assemblies 34 is equal to the number of solar array assemblies 22. The solar tracking shelter preferably comprises one drive assembly 32.

FIG. 2 shows solar array support structure 50 comprising array support tube 56, truss assembly 52, and edge guard 54. Solar modules 24 attach to solar array support structure 50. Support structure 50 is preferably constructed of steel, another metal, or other similarly rigid material.

Figure 3:
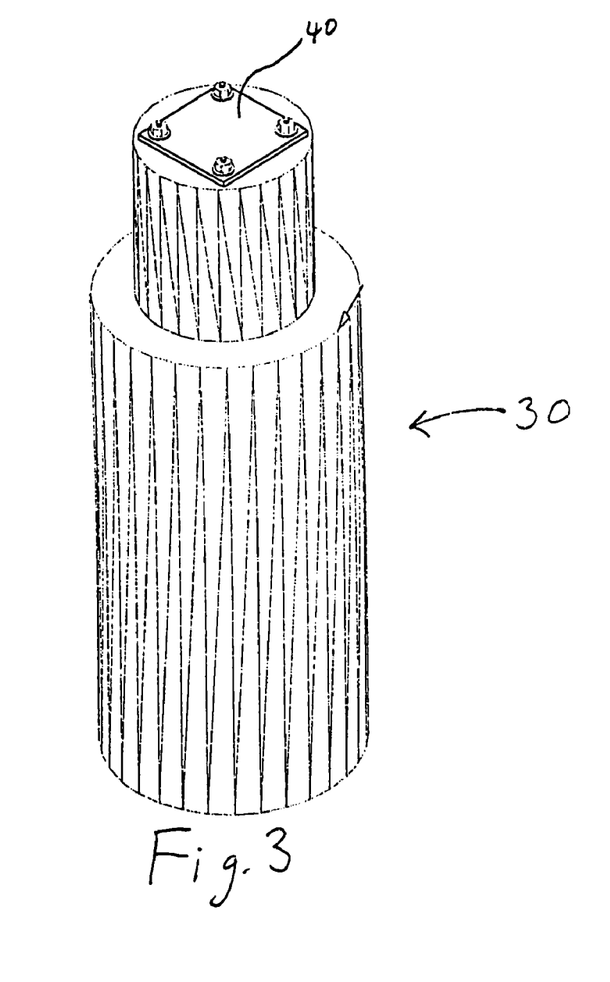
FIG. 3 is a top perspective view of the support pier of the embodiment of FIG. 1.
Figure 4:
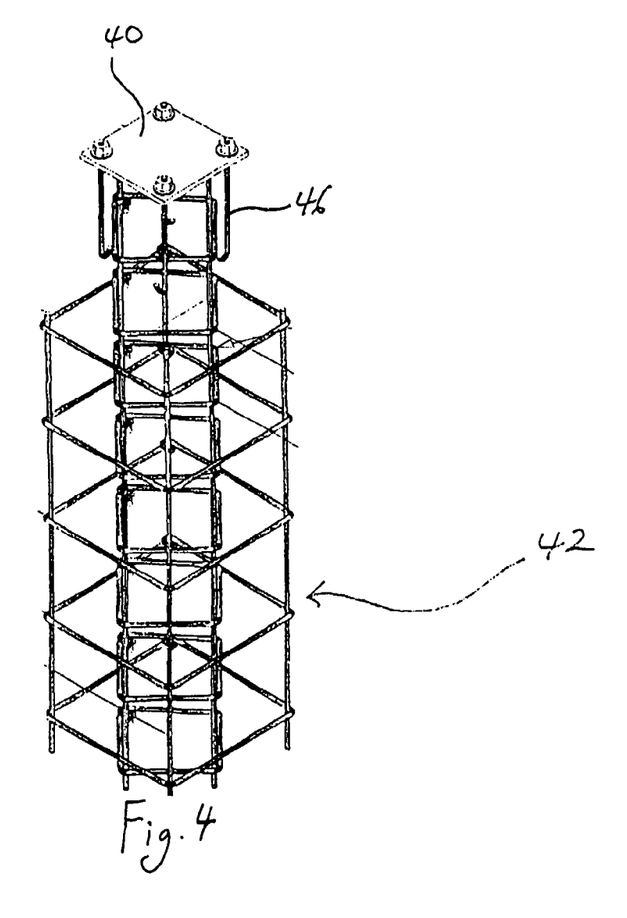
FIG. 4 is a top perspective view of the rebar structure of the support pier of the embodiment of FIG. 1.

FIG. 3 shows pier 30 with attached attachment plate 40. FIG. 4 shows preferred rebar structure 42 that supports the concrete of which pier 30 is preferably constructed. Attachment plate 40 preferably attaches to pier 30 via J-bolts although other fasteners known in the art may be used.

Figure 5:
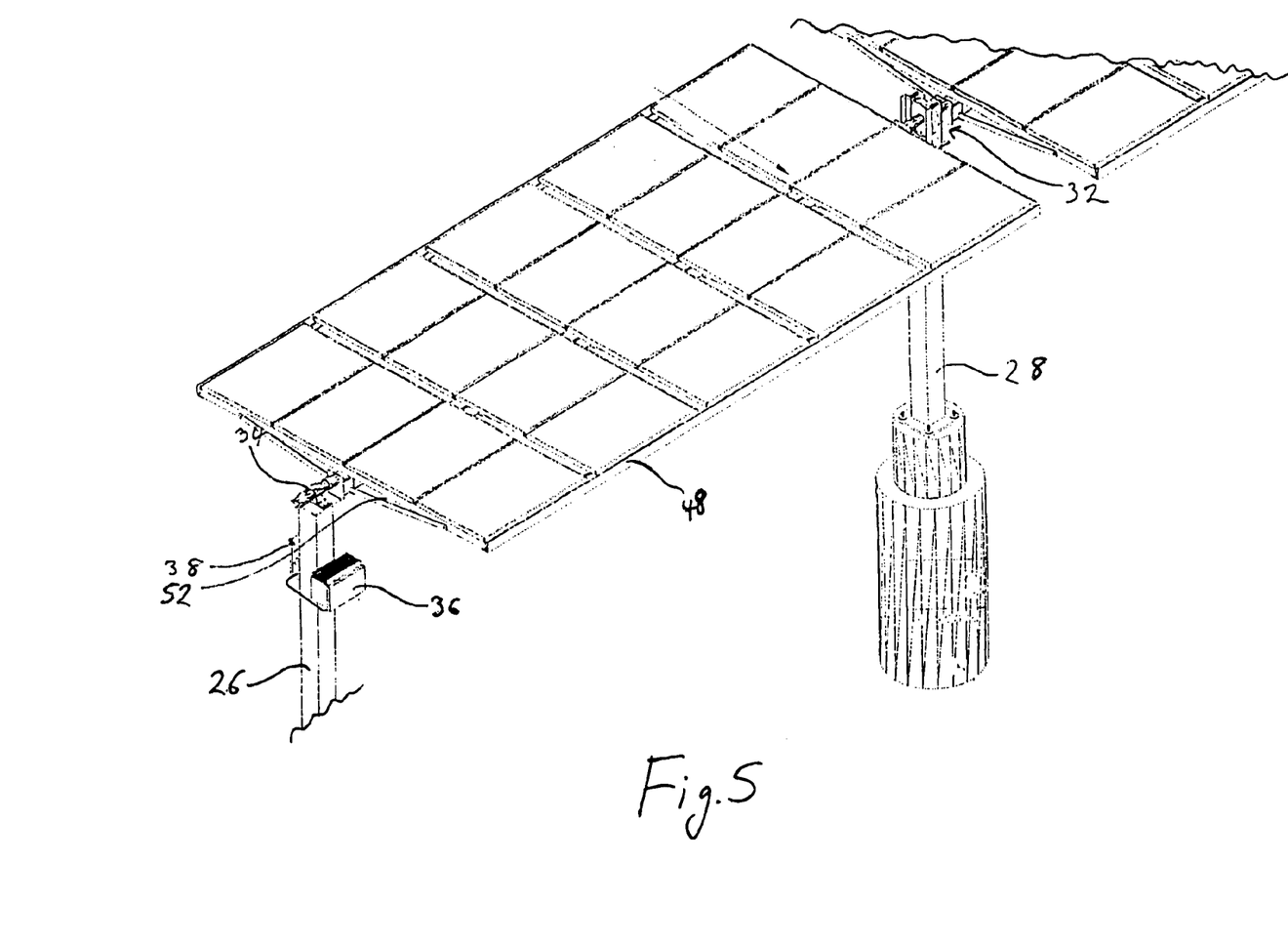
FIG. 5 is a top perspective view showing the photovoltaic modules of the embodiment of FIG. 1.

FIG. 5 is another view showing solar array assembly 22 disposed on truss assembly 52, rotor bearing assembly 34 disposed on support pillar 26, drive assembly 32 disposed on drive assembly 28. Also shown are DC power disconnect 38 and DC to AC power inverter 36, both preferably disposed on support pillar 26. Inverter 36 is preferably 2.5 kW.

Figure 6:
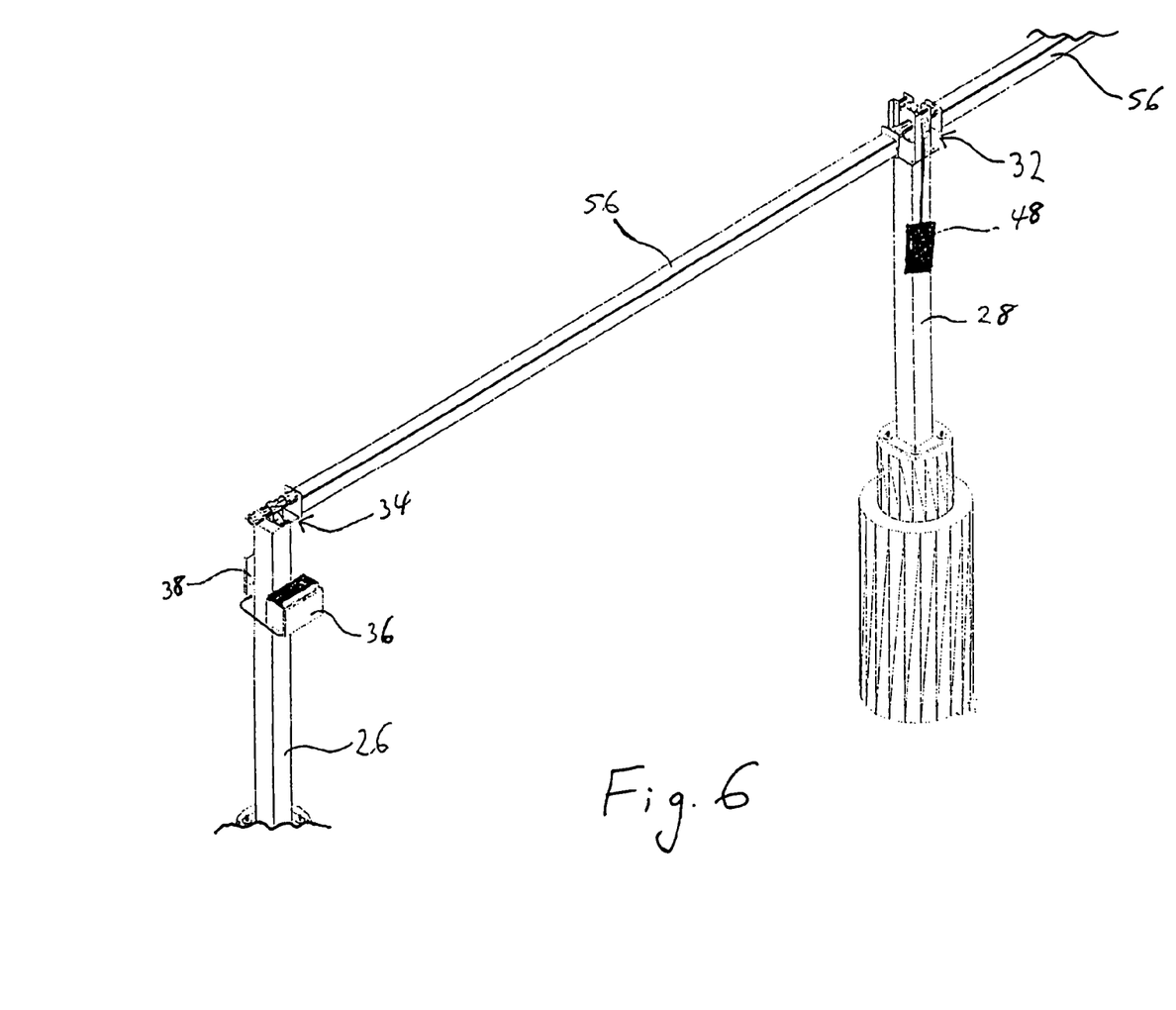
FIG. 6 is a top perspective view of the embodiment of FIG. 1 showing the array support tube.

FIG. 6 shows array support tube 56 connected to drive assembly 32 and rotor bearing assembly 34. Also shown is tracking drive mechanism 48 disposed on support pillar 28. Drive assembly 32 comprises a drive actuator assembly that is preferably grid-tied to solar array assembly 22 and to generators (not shown), if utilized, for controlling movement of solar array assembly 22. In the preferred embodiment, drive assembly 32 is controlled by drive mechanism 48.

Figure 7A:
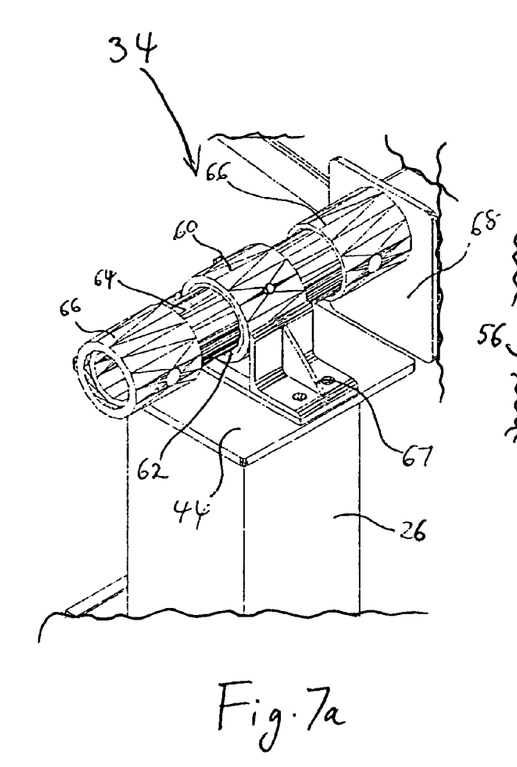
FIG. 7a shows a perspective view of the rotor bearing assembly of the embodiment of FIG. 1.

FIG. 7a is an exploded view of rotor bearing assembly 34. Disposed on mounting plate 44 of support pillar 26 is mounting bracket 67 which in turn holds bearing housing 62. Bearing housing 62 is disposed within sleeve bearing 60. Within bearing housing 62 turns coupler tube 64. Coupler tube 64 also turns within end coupler torque tube 66 which is fixed onto end plate 68 of array support tube 56.

Figure 7B:
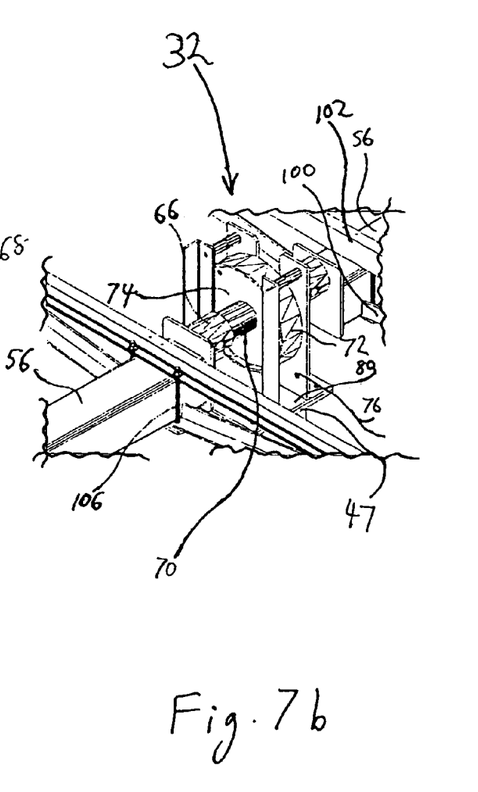
FIG. 7b shows a perspective view of the drive assembly of the embodiment of FIG. 1.

FIG. 7b is an exploded view of drive assembly 32. Disposed on mounting plate 47 of support pillar 28 is base plate 80. Disposed on base plate 80 is face plate 73 to which coupler tube 70 and coupler plate 74 are disposed. Coupler tube 70 turns within end coupler torque tube 66.

Figure 8:
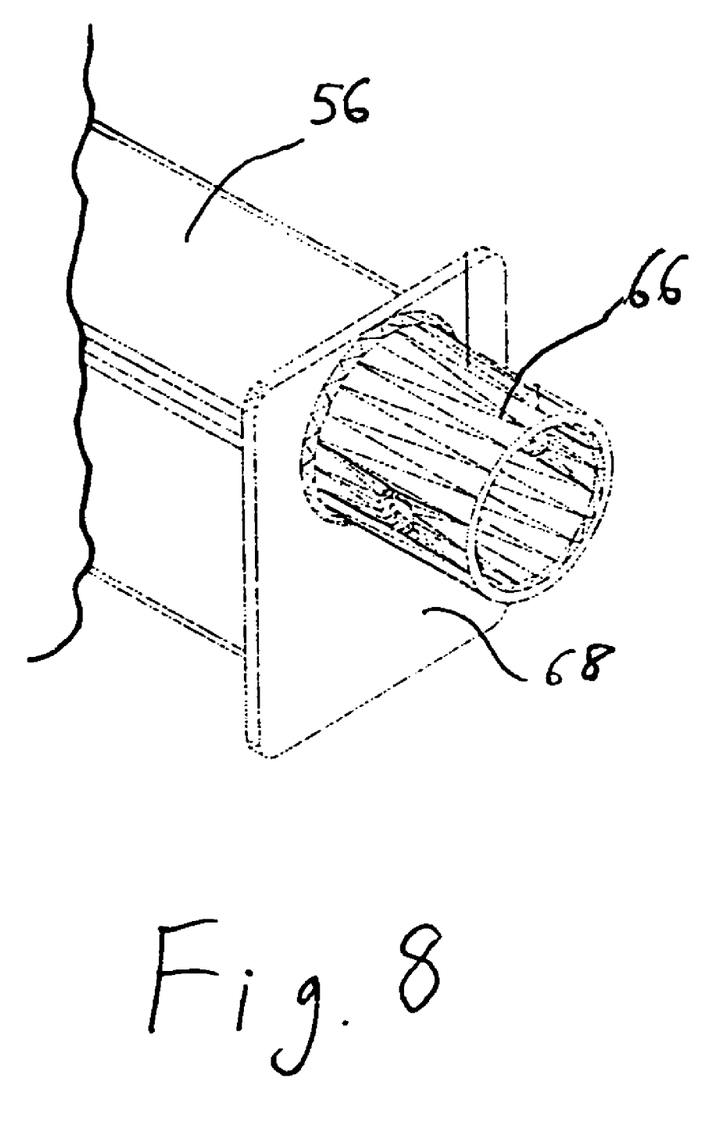
FIG. 8 shows a perspective view of the end coupler tube and array support tube of the embodiment of FIG. 1.

FIG. 8 is an exploded view of end coupler torque tube 66 fixed onto end plate 68 of array support tube 64.

Figure 9A:
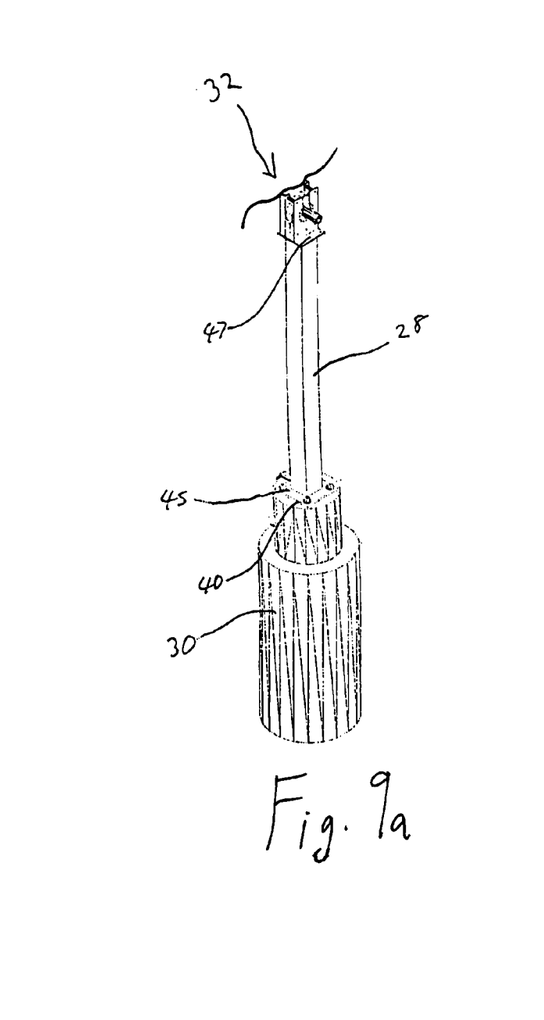
FIG. 9a shows a perspective view of the drive assembly and its support pillar of the embodiment of FIG. 1.
Figure 9B:
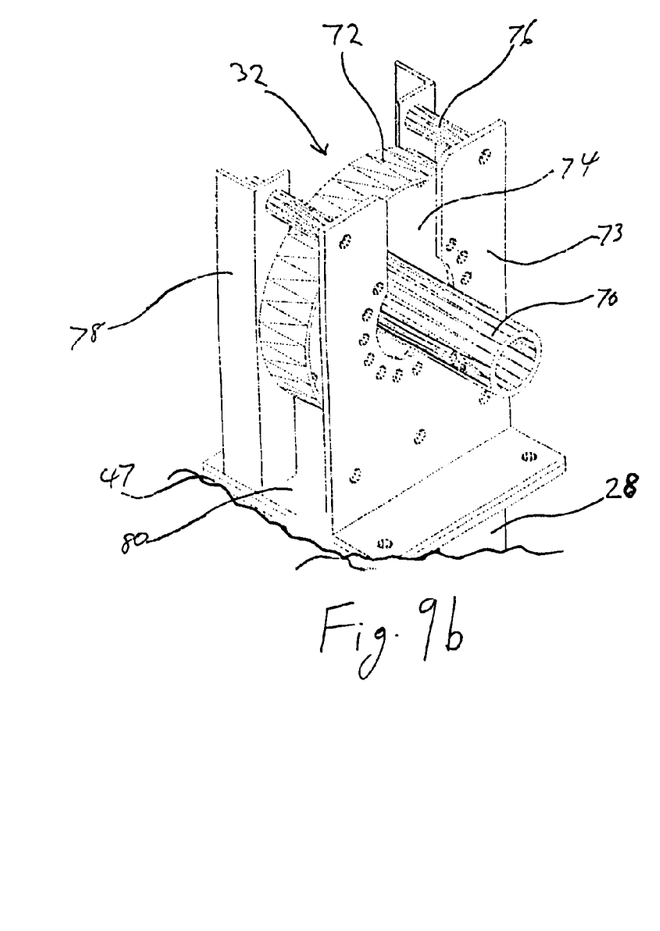
FIG. 9b shows a perspective view of the drive assembly of the embodiment of FIG. 1.

FIG. 9a is another view showing drive assembly 32 disposed via base plate 80 to support pillar 28. Support pillar 28 is attached via pillar attachment plate 45 to attachment plate 40 of pier 30. FIG. 9b is an exploded view of drive assembly 32. Base plate 80 is attached to mounting plate 47. Face plate 73 is attached to base plate 80. Coupler tube 70 turns within face plate 73. Shroud 72 surrounds coupler plate 74. Also shown are spacers 76 which attach back angle supports 78 to face plate 73.

Figure 10A:
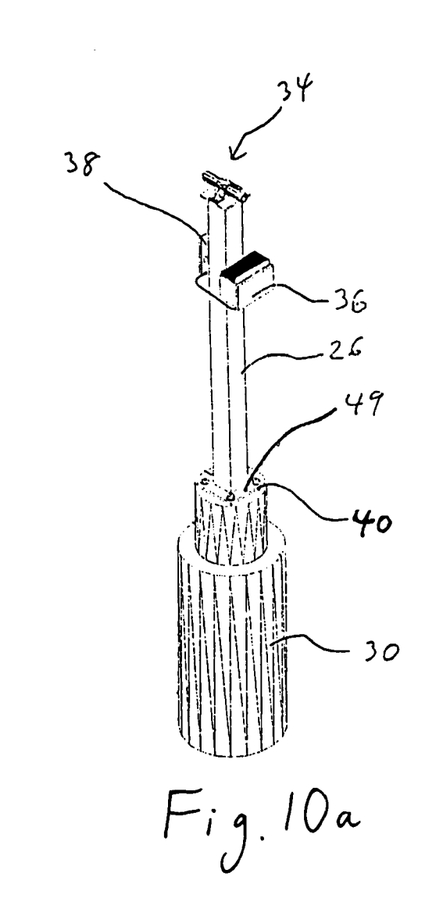
FIG. 10a shows a perspective view of the rotor bearing assembly and its support pillar of the embodiment of FIG. 1.
Figure 10B:
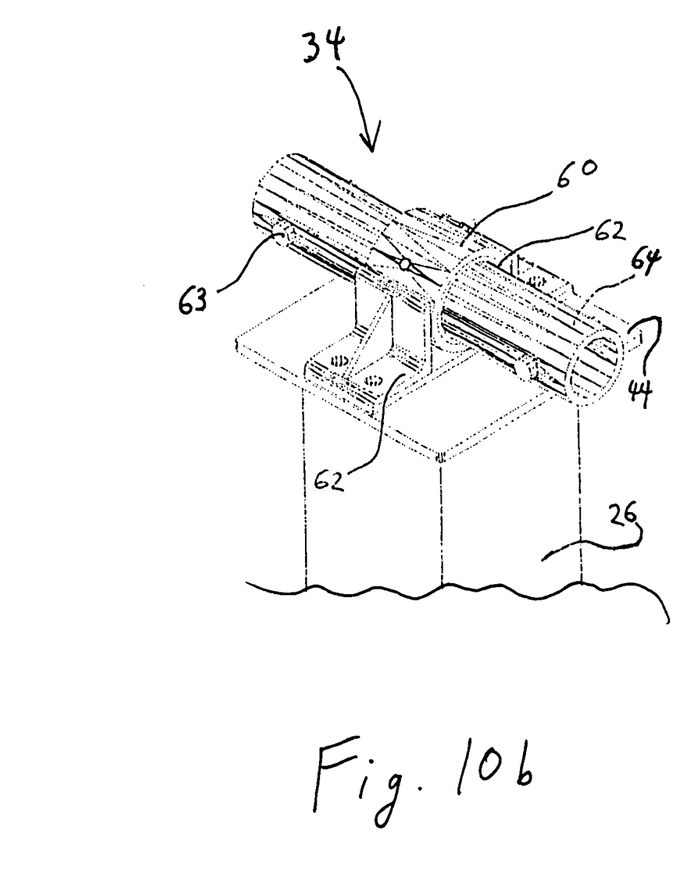
FIG. 10b shows a perspective view of the rotor bearing assembly of the embodiment of FIG. 1.

FIG. 10a is another view of rotor bearing assembly 34 attached to support pillar 26 which attaches to attachment plate 40 of pier 30 via pillar attachment plate 49. Also shown are inverter 36 and DC disconnect 38. FIG. 10b shows mounting bracket 67 attached to mounting plate 44. Attached to mounting bracket 67 is sleeve bearing 60 which houses bearing housing 62. Within bearing housing 62 turns coupler tube 64. Fasteners 63 fasten coupler tube to end coupler torque tube 66.

In the preferred embodiment, each solar array assembly 22 is disposed on one solar array support structure 50 with one array support tube 56. Array support tubes 56 may be linked together via end coupler tube 66 of array support tube 56 and coupler tube 64 of rotor bearing assembly 34 and/or coupler tube 70 of drive assembly 32. Therefore, any number of solar array assemblies may be linked to form any size solar tracking structure 20. Solar array assembly 22 may therefore be assembled off-site then linked to other solar array assemblies 22 on-site as desired.

Figure 11:
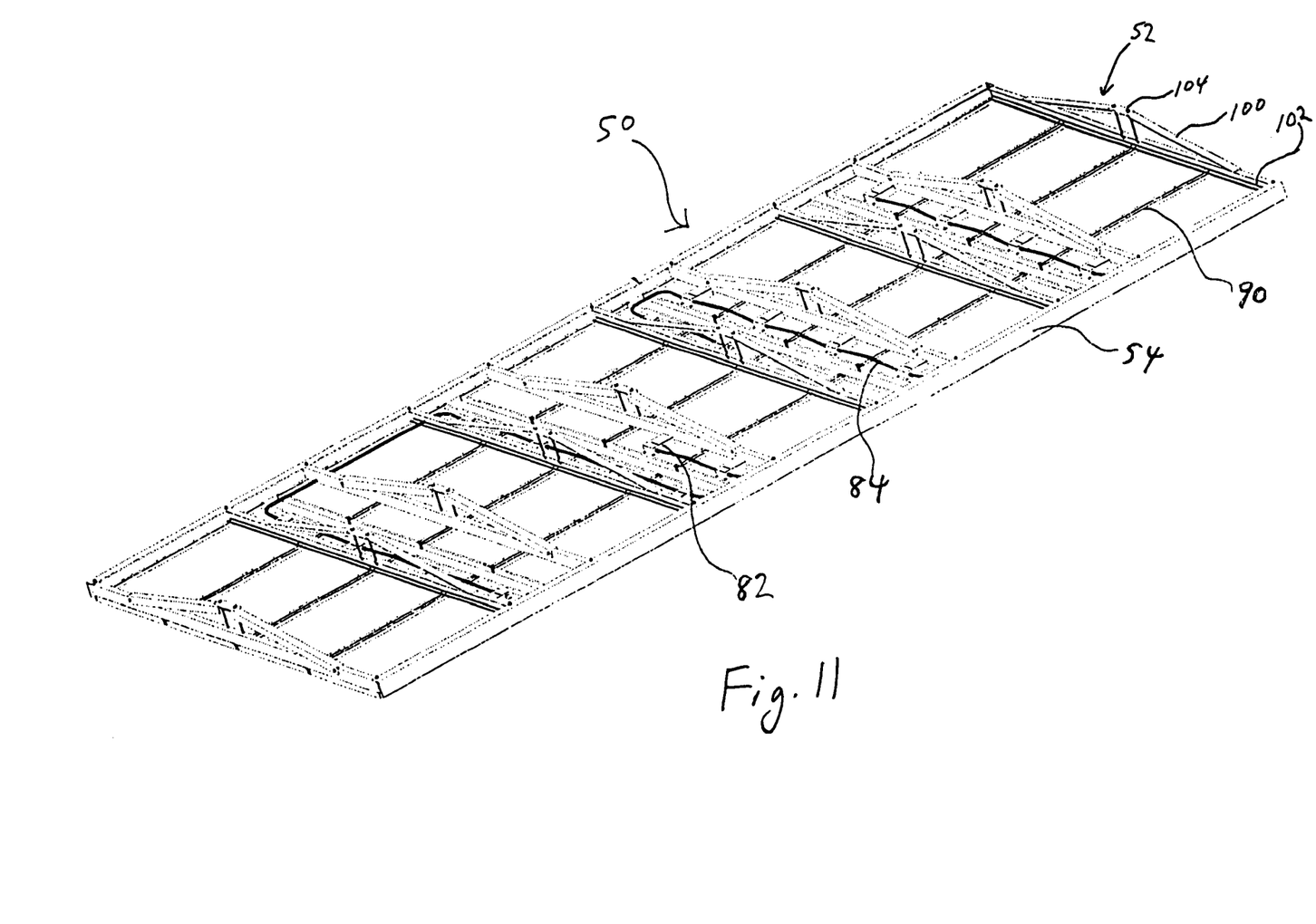
FIG. 11 shows a bottom perspective view of the solar array support structure of the embodiment of FIG. 1.

FIG. 11 shows the underside of solar array support structure 50. Truss assembly 52 comprising angle strut 100, mounting rail 102, and mounting clamp 104 is shown. Edge guard support 54 is also shown. Solar array assembly 22 attaches to mounting rail 102 and edge guard support 54. Truss assembly 52 attaches to array support tube via mounting claim 104. Also shown in FIG. 11 are electrical junction box 82 and electrical conduit 84 preferably incorporated into solar tracking vehicle shelter 20 to conduct the solar power into a building electrical interface box or other interface (e.g., remote or attached, not shown) so that a nearby building or structure may utilize the solar power from solar tracking vehicle shelter 20.

Figure 12:
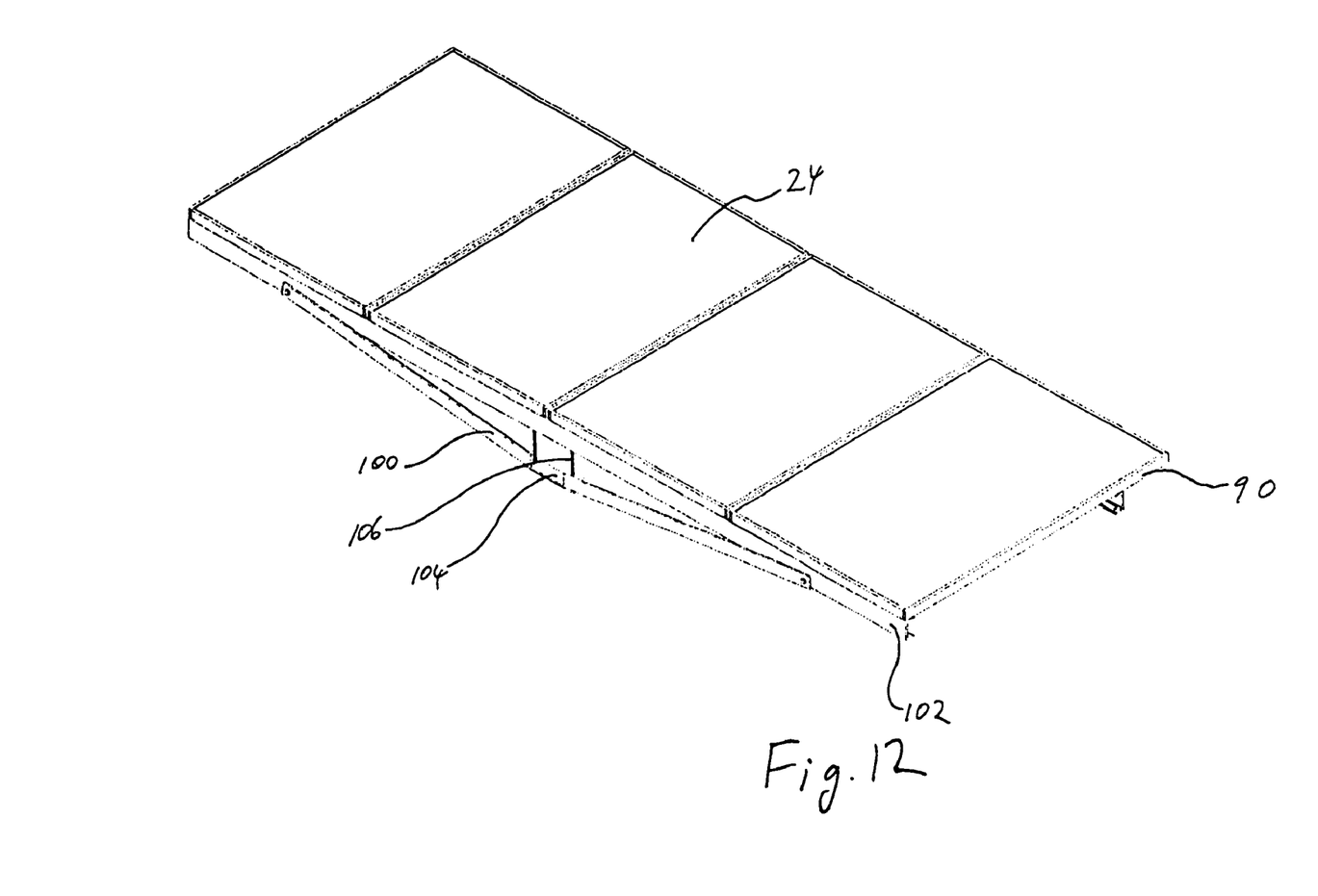
FIG. 12 shows a top perspective view of a solar array panel and supporting truss structure of the embodiment of FIG. 1.

FIG. 12 is an exploded view of solar modules 24 comprising frames 90 disposed on truss assembly 52 via mounting rail 102. Angle strut 100 and mounting claim 104 attach to array support tube with the aid of clamp fasteners 106.

Also a part of solar tracking vehicle shelter 20 are appropriate disconnects (not shown), safety switches (not shown) and combiner boxes (not shown) for each solar array assembly 22. Any number of solar modules 24 may be utilized. Likewise, different wattages for the components may be utilized.

Smaller, individualized inverters 36 minimize the impact of inverter failure on solar array assembly 22 and are easily replaced. The energy produced from the solar array assembly 22 is transferred to an electrical interface box (not shown) in a nearby building or structure.

Generators (not shown), if utilized, are preferably two generators (e.g., 60 kW), one generator e.g., 20 kW) and transfer switches (e.g., three) per solar array assembly 22. Solar array assembly 22 preferably has pre-manufactured cells, but the structure of the array is built on-site and preferably includes a building electrical interphase such as electrical junction box 82.

Solar tracking vehicle shelter 20 is preferably used as a carport, but may alternatively be used as a shelter for any purpose such as, for example, a weather structure, a porch, or similar structure. Solar array assembly 22 protects and shields the items in the spaces under solar array assembly 22 while providing energy to the attached or nearby building or structure. If solar tracking vehicle shelter 20 is used as a carport, each solar array assembly 22 may accommodate up to two full-sized vehicles.

In other alternative embodiments solar tracking vehicle shelter 20 may include optional solar array assembly 22 or more generators.

EXAMPLE

A solar tracking carport was constructed in accordance with the present invention. There were included twenty Photowatt PW 1250 PV modules per solar array assembly, a 600 Vdc DC disconnect with enclosure per solar array assembly, one 2.5 kW inverter per solar array assembly, a single-axis tracking array apparatus, an AC service panel with enclosure, an AC/Utility main disconnect, 125 watt photovoltaic modules, and disconnects, safety switches and combiner boxes for each section.

Each solar array assembly measured approximately 24 feet in length, approximately 12 feet in width, and the bottom edge of each array rose approximately 8 feet, 6 inches in height off the ground.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A shelter-providing solar tracking assembly comprising:
   at least one fixed support structure comprising:
      at least one support pillar, each said support pillar having a first end connected to a ground surface and extending substantially vertically along a longitudinal axis from said first end to a second end;
      a horizontal array support beam disposed at said second end of said at least one support pillar, said horizontal array support beam comprising a longitudinal axis substantially perpendicular to said longitudinal axis of said at least one support pillar;
   at least one drive assembly disposed at said second end of at least one of said support pillars, positioned collinear with said horizontal array support beam and comprising at least one drive assembly coupler tube;
   at least one rotor bearing assembly comprising at least one rotor bearing assembly coupler tube rotatable disposed in a sleeve bearing, said rotor bearing assembly coupler tube further rotatably disposed within a coupler torque tube and disposed at said second end of at least one of said support pillars;
   at least one solar power array disposed on said support structure comprising a plurality of solar panels comprising photovoltaic cells, said at least one solar power array moveable on a tracking axis and in communication with said drive assembly to track movement of the sun, said at least one solar power array forming an overhead canopy for at least one item disposed directly beneath said at least one solar power array, and providing electrical power to a building or structure located nearby;
   an inverter to convert energy from direct current to alternating current; and
   said at least one support pillar at a sufficient height to permit placement of the at least one item beneath said canopy without obstructing a movement of said at least one solar power array about said tracking axis.

2. The assembly of claim 1 further comprising a back-up generator.

3. The assembly of claim 1 further comprising at least one battery to store generated power.

4. The assembly of claim 1 further comprising at least one electric output connector.

5. The assembly of claim 1 wherein the item comprises at least one vehicle disposed directly beneath said at least one solar power array.

6. The assembly of claim 1 wherein said rotor bearing assembly is disposed at said second end of said at least one support pillar not having disposed thereon said drive assembly.

7. The assembly of claim 1 comprising at least two said solar power arrays and comprising at least two said support structures.

8. The assembly of claim 7 wherein said at least two support structures are connected to each other longitudinally.

9. The assembly of claim 6 comprising at least two said solar power arrays and at least two said support structures, wherein each end of each said horizontal support beam is connected to said drive assembly or to said rotor bearing assembly so that said at least two support structures are linked.

10. The assembly of claim 1 wherein the ground surface is parking for vehicles.

11. The assembly of claim 5 comprising a canopy for multiple vehicles.

12. The assembly of claim 11 wherein said canopy is a carport.

13. The assembly of claim 1 wherein the item is a car or truck.

14. The assembly of claim 1 wherein said at least one support pillar is made of concrete.

15. The assembly of claim 1 wherein said at least one drive assembly is attached to one end of said horizontal array support beam and disposed on a mounting plate at a juncture of said longitudinal axis of said horizontal support beam and said longitudinal axis of at least one of said at least one support pillar.

16. The assembly of claim 1 comprising multiple said solar power arrays moveable on a single axis.

17. The assembly of claim 1 wherein said axis is defined by said longitudinal tracking axis of said horizontal support beam.

18. The assembly of claim 1 wherein said sleeve bearing is attached to a bracket.

19. The assembly of claim 18 wherein said bracket is attached to a mounting plate.

20. The assembly of claim 19 wherein said mounting plate is attached to said at least one support pillar.

21. The assembly of claim 1 wherein said coupler torque tube is disposed perpendicular to an end plate.

22. The assembly of claim 21 wherein said end plate is attached to at least one end of said horizontal array support beam.

23. The drive assembly of claim 1 wherein said drive assembly coupler tube is attached to a coupler plate.

24. The assembly of claim 23 wherein a shroud is disposed adjacent to said coupler plate.

25. The assembly of claim 1 wherein said horizontal array support beam links to another horizontal array support beam via said rotor bearing assembly coupler tube.

26. The assembly of claim 1 wherein said horizontal array support beam links to another horizontal array support beam via said drive assembly coupler tube.

* * * * *